US005868154A

United States Patent [19]

Jones

[11] Patent Number: 5,868,154

[45] Date of Patent: Feb. 9, 1999

[54] PROPANE SUPPLY SYSTEM WITH SECONDARY CONTAINMENT TANK

[76] Inventor: Stan Jones, P.O. Box 1561, St. Augustine, Fla. 32085

[21] Appl. No.: 994,629

[22] Filed: Dec. 19, 1997

[51] Int. Cl.[6] .............................. G05D 7/00; G05D 9/00; F16K 33/00

[52] U.S. Cl. ...................... 137/202; 137/428; 137/505.12

[58] Field of Search .................................... 137/202, 386, 137/428, 505.12, 571, 572

[56] References Cited

U.S. PATENT DOCUMENTS

| | | | |
|---|---|---|---|
| 1,638,434 | 8/1927 | Curme, Jr. et al. | 137/572 |
| 2,217,583 | 10/1940 | Whtie | 137/505.12 |
| 2,280,309 | 4/1942 | Graham | 137/505.12 |
| 2,348,357 | 5/1944 | Parks | 137/202 |
| 2,728,196 | 12/1955 | Bowser | 137/202 |
| 2,848,879 | 8/1958 | Hesson | 137/202 |
| 2,995,201 | 8/1961 | Stafford et al. | 137/202 |
| 3,106,956 | 10/1963 | Smith et al. | 137/202 |

*Primary Examiner*—George L. Walton
*Assistant Examiner*—Bryan Wallace
*Attorney, Agent, or Firm*—Thomas C. Saitta

[57] ABSTRACT

A propane gas delivery system having a large storage tank, a supply conduit to deliver propane gas, a first regulator and a second regulator to reduce pressure, where a secondary containment tank is provided to receive and retain any liquid propane which enters the supply conduit, whether due to overfilling of the main tank or condensation within the supply conduit, and which allows the liquid propane to reconvert into the gas phase. A float valve is provided in the outflow conduit of the secondary tank to prevent flow of liquid propane from the secondary tank in the event the amount of liquid trapped by the secondary tank exceeds its retention capacity.

4 Claims, 1 Drawing Sheet

PROPANE SUPPLY SYSTEM WITH SECONDARY CONTAINMENT TANK

BACKGROUND OF THE INVENTION

This invention relates generally to the field of propane delivery systems, where liquid propane is stored under pressure in a tank and the propane is delivered as a gas through supply conduits to devices which utilize the propane gas as a fuel. More particularly, the invention relates to such systems where a pair of regulators are provided in the gas supply conduits, the first regulator reducing the pressure in the supply conduit to approximately 10 psi and the second reducing the pressure to less than 0.5 ounces per square inch for use by household appliances and the like. Even more particularly, the invention relates to such systems where a secondary containment tank, of relatively small volume, is provided in the supply conduit between the two regulators, the secondary tank retaining any liquid propane which has condensed in the supply conduit and having a float valve to prevent liquid propane from flowing through the second regulator and to the household devices.

The use of propane gas to provide fuel for various devices or household appliances is well known. In the typical systems, a large tank capable of holding hundreds of gallons of liquid propane is provided at an external location. The tank is filled with liquid propane under pressure ranging from about 10 to 125 psi, the actual pressure being dependent on the ambient temperature, the low value occurring when the outside temperature is below zero degrees and the upper value occurring when the temperature is in the eighties or higher. A portion of the liquid propane changes to propane gas and is passed through a first regulator which reduces the pressure to about 10 psi. The propane gas is then conducted through a supply conduit or pipeline to a second regulator, which reduces the pressure of the gas in the supply conduit to less than about 0.5 ounces per square inch, which is a desirable pressure for use in most appliances and devices.

The tank is kept external to and separated a distance from the building for safety reasons. This means that the supply conduit must be relatively lengthy and is exposed to the elements to some degree. When the ambient temperature drops, the propane gas in the supply conduit may condense into liquid propane. Likewise, if the main tank is overfilled, liquid propane may be forced into the supply conduit. In either case, it is possible for liquid propane to pass through the supply conduit and into the household appliances or other devices. This is very dangerous, as the liquid propane may blow out the seals and a fire or explosion may result.

It is an object of this invention to provide a system for the delivery of propane gas, or any other similar gas where condensation back into the liquid phase in the supply conduit is detrimental, which incorporates a secondary containment tank to receive and retain any liquid propane which has condensed or been inadvertently drawn into the supply conduit, where the liquid propane is allowed to vaporize in the tank for passage through the second regulator. It is a further object to provide such secondary tank with a valve means which shuts off all flow from the secondary tank in the event the liquid propane level nears the point where it would be drawn into the second regulator.

SUMMARY OF THE INVENTION

The invention comprises in general a system for the storage and delivery of propane gas, or any similar gas, through a supply conduit which provides the gas at relatively low pressure to devices or appliances. The invention comprises a relatively large external storage tank for retention of large volumes of liquid propane under pressure, with conduit means to deliver propane which has changed into the gas phase to, typically indoor, devices or appliances where the propane gas is used as fuel. A first regulator reduces pressure in the supply conduit to less than about 10 psi, and a second regulator reduces the pressure even further to about 0.5 ounces per square inch for use by the appliances. A secondary containment tank of much smaller volume than the main tank is provided in the conduit between the first and second regulator, and preferably near the second regulator and at a location near the point of entry of the conduit into the building housing the appliances. The secondary tank acts as a trap or sump to retain any propane which is present in the conduit, whether because of condensation back into the liquid phase or because of overfilling or over-pressurization of the main tank, and prevents the liquid propane from passing through the second regulator and to the appliances. For small amounts of liquid propane, the secondary tank allows it to evaporate into the gas phase under the right conditions. If large amounts of liquid propane are trapped in the secondary tank, the tank is provided with valve means, preferably a float valve, which shuts off all flow from the tank to the second regulator and to the appliances in the event the liquid level inside the secondary tank approaches the point where liquid propane would be drawn or forced into the outlet conduit of the secondary tank.

DETAILED DESCRIPTION OF THE INVENTION

Figure 1:
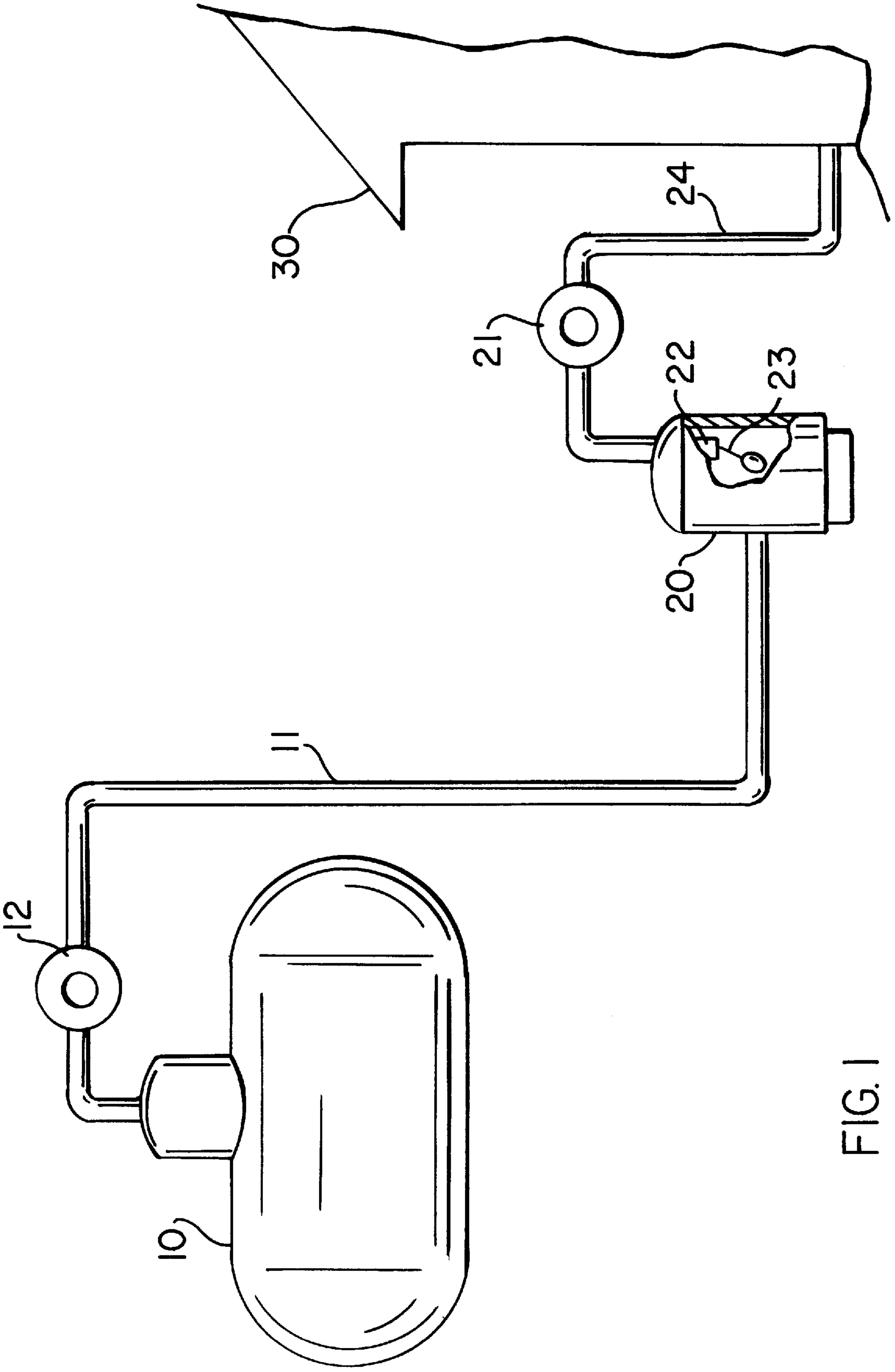
FIG. 1 is a representational illustration showing the components of the system.

With reference to the drawing, the invention will now be described in detail with regard for the best mode and the preferred embodiment. While the invention is described herein primarily as used for propane, it is to be understood that the system would be applicable to any similar gas where an unwanted condensation from the gas phase to the liquid phase may occur during supply due to ambient or other external conditions.

The invention is an improvement in a standard system for the storage and delivery of propane, the system comprising a main storage tank 10, a first stage supply conduit means 11, a first pressure regulator means 12, a second pressure regulator means 21 and a second stage conduit means 24. The system provides the means to deliver propane gas to devices, such as household appliances including water heaters, stoves, etc., which are located within a building 30, although the system may also be used to deliver propane gas to any devices utilizing the propane as fuel, whether indoors or outdoors. Propane is a substance which is normally in the gas phase at ambient temperatures. However, under sufficient pressure or at low temperatures, or with a suitable combination of pressure and temperature, the propane will enter the liquid phase. The propane is stored primarily in the liquid phase under pressure in a main storage or evaporator tank 10, a tank having a relative large volume of usually more than 100 gallons, constructed of suitable material to withstand pressures of 125 psi and greater. Typical pressures within the main tank 10 will range from about 125 psi at ambient temperature of about 80 degrees F. to about 10 psi at temperatures below zero degrees F. A portion of the liquid propane within tank 10 will evaporate or boil into the gas phase until a point of equilibrium is reached.

For safety and access purposes, the main storage tank 10 is positioned a distance from any building 30. Conduit means to deliver the propane gas to the building 30, shown in the drawing as a combination first stage 11 and second stage 24 conduit means, is connected in communicating manner to the main tank 10. Conduit means 11 and 24 is any pipeline or supply conduit member suitable for use with propane gas. A first pressure regulator means 12 is connected in communicating manner to the storage tank 10 or near the storage tank 10 in the supply conduit 11, and may comprise any of the well known regulator devices commonly in use in these systems. The regulator 12 reduces the pressure in the conduit 11, so that regardless of the pressure within the tank 10 the pressure within the conduit 11 is about 10 psi. The conduit 11 is preferably buried if possible to reduce the effect of temperature changes on the propane gas, but portions will always be above ground. A second pressure regulator means 21, again comprising any known regulator device in use in these systems, is connected to the first stage supply conduit 11 adjacent building 30 and reduces the pressure in the conduit 11 down to about 0.5 ounces per square inch for delivery through second stage supply conduit 24, which is the optimum pressure for use with most propane burning devices or appliances. Smaller conduits within the building 30 deliver the propane gas to each device as required.

The improvement resides in the provision of a secondary containment tank 20 which has a relatively small volume, preferably about 5 gallons, which like the main storage tank 10 is suitably constructed to retain propane gas at relatively high pressure if necessary. The secondary containment tank 20 is preferably positioned external to the building 30 and in line before and relatively adjacent to the second regulator 21, and in communicating manner with first stage supply conduit 11 coming from the first regulator 12 and main storage tank 10, such that propane gas coming from storage tank 10 passes into secondary tank 20 before passing through the second regulator 21 and second stage supply conduit 24 and into building 30. Secondary tank 20 has an outlet conduit 22 which terminates in the upper portion of the tank 20 such that the propane gas is forced by the system pressure through the outlet conduit 22 and into the building 30. Check valve means 23 are provided in conjunction with the outlet conduit 22, the valve means 23 allowing unimpeded passage of propane gas through outlet conduit 22 but which prevents any liquid propane from passing through outlet conduit 22 and into building 30. Preferably, valve means 23 is a float-type check valve which is directly responsive to the level of the liquid propane within secondary tank 20, such that if the liquid propane level rises near the opening of outlet conduit 22, the float valve 23 will close the outlet conduit 22 to prevent passage of liquid propane from secondary tank 20. Such valves are well known in the art.

The system operates in normal manner and the secondary containment tank 20 does not interfere with the normal flow of propane gas from the main storage tank 10 through conduits 11 and 24 and the first and second regulators 12 and 21 and into building 30, unless liquid propane is present in the supply conduit 11. Liquid propane may occur in the conduit 11 under several conditions. If the main tank 10 is overfilled or over-pressurized, liquid propane may be forced or drawn into supply conduit 11. Also, if the ambient temperature drops, the temperature of all or portions of supply conduit 11 may drop sufficiently such that the propane gas contained within the conduit 11 condenses into the liquid phase. It is extremely dangerous for liquid propane to be passed into the fuel burning devices within building 30, as the liquid may force out the seals and cause a fire or explosion. With the secondary containment tank 20 in use, any liquid propane present in supply conduit 11 is collected in the interior of the tank 20, and because the outlet conduit 22 is located in the upper region of the tank 20, only propane gas can pass through the second regulator 21 and into building 30. Over time and due to changes in temperature and pressure within the tank 20, the liquid will convert back into the gas phase to be exhausted from tank 20 in the normal manner through outlet conduit 22. Should the amount of liquid propane gathered in secondary tank 20 be of such large volume that the liquid surface level approaches the opening of outlet conduit 22, the float valve means 23 will close off outlet conduit 22 to prevent passage of any liquid propane into building 30. When the level of the liquid propane drops due to direct removal of the liquid from secondary tank 20 or conversion of sufficient amount of liquid to the gas phase, the valve means 23 will open outlet conduit 22, again allowing flow of propane gas through the system.

It is understood that equivalents and substitutions for certain elements and components set forth above may be obvious to those skilled in the art, and the true scope and definition of the invention therefore is to be as set forth in the following claims.

I claim:

1. In a propane delivery system comprising a main storage tank for storing the propane in the liquid phase, conduit means for delivery of the propane in the gas phase, a first pressure regulator means to reduce the pressure within the conduit means and a second pressure regulator means to further reduce the pressure in the conduit means, where the gas phase propane in the conduit means may condense into the liquid phase in response to a drop in ambient temperature or where liquid propane may be forced into the conduit means by overfilling the main storage tank, the improvement comprising a secondary containment tank connected in communicating manner to said conduit means between said first pressure regulator means and said second pressure regulator means, said secondary containment tank receiving and retaining any propane in the liquid phase which is present in said conduit means and allowing passage only of propane in the gas phase to said second pressure regulator, where said secondary containment tank comprises an outlet conduit positioned in the upper region of said secondary containment tank and check valve means directly connected to said outlet conduit and responsive to the level of the liquid propane in said secondary containment tank, where said check valve means prevents flow of propane in the gas and liquid phase through said outlet conduit when the liquid level in said secondary containment tank rises to a predetermined level.

2. The system of claim 1, where said check valve means comprises a float valve responsive to the level of propane in the liquid phase within said secondary containment tank, such that a rise in the liquid level in said secondary containment tank raises said float valve into a closed position.

3. A propane delivery system comprising a main storage tank for storing the propane in the liquid phase, conduit means for delivery of the propane in the gas phase, where the gas phase propane in the conduit means may condense into the liquid phase in response to a drop in ambient temperature or where liquid propane may be forced into the conduit means by overfilling the main storage tank, a first pressure regulator means to reduce the pressure within the conduit means, a second pressure regulator means to further reduce the pressure in the conduit means, and a secondary containment tank connected in communicating manner to said conduit means between said first pressure regulator means and said second pressure regulator means, said secondary containment tank receiving and retaining any propane in the liquid phase which is present in said conduit means and allowing passage only of propane in the gas phase to said second pressure regulator, where said secondary containment tank comprises an outlet conduit positioned in the upper region of said secondary containment tank and check valve means directly connected to said outlet conduit and responsive to the level of the liquid propane in said secondary containment tank, where said check valve means prevents flow of propane in the gas and liquid phase through said outlet conduit when the liquid level in said secondary containment tank rises to a pre-determined level.

4. The system of claim 3, where said check valve means comprises a float valve responsive to the level of propane in the liquid phase within said secondary containment tank, such that a rise in the liquid level in said secondary containment tank raises said float valve into a closed position.

* * * * *